/*(12)*/ United States Patent  
Tannas

(10) Patent No.: US 7,938,051 B2
(45) Date of Patent: May 10, 2011

(54) APPARATUS AND METHODS FOR CUTTING ELECTRONIC DISPLAYS DURING RESIZING

(76) Inventor: Lawrence E. Tannas, Orange, CA (US)

( * ) Notice: Subject to any disclaimer, the term of this patent is extended or adjusted under 35 U.S.C. 154(b) by 851 days.

(21) Appl. No.: 11/135,785

(22) Filed: May 23, 2005

(65) Prior Publication Data

US 2011/0075091 A1    Mar. 31, 2011

Related U.S. Application Data

(60) Provisional application No. 60/573,421, filed on May 21, 2004.

(51) Int. Cl.
 *G02F 1/13* (2006.01)
 *G02F 1/1333* (2006.01)
 *C02B 33/07* (2006.01)
 *C02B 33/33* (2006.01)
 *C02B 33/10* (2006.01)
 *C02B 33/00* (2006.01)

(52) U.S. Cl. .................. 83/880; 83/886; 225/2; 225/94; 225/96.5; 349/187; 349/190

(58) Field of Classification Search .......... 225/2, 94–96, 225/96.5; 83/663, 861–887; 349/96, 153, 349/187
See application file for complete search history.

(56) References Cited

U.S. PATENT DOCUMENTS

| 4,275,494 A | 6/1981 | Kohyama et al. |
| 5,278,685 A | 1/1994 | Iwamoto et al. |
| 5,610,742 A | 3/1997 | Hinata et al. |
| 5,757,456 A | 5/1998 | Yamazaki et al. |
| 5,781,258 A | 7/1998 | Dabral et al. |
| 5,808,719 A | 9/1998 | Fujiwara et al. |
| 5,812,226 A | 9/1998 | Izumi et al. |
| 5,851,411 A | 12/1998 | An et al. |
| 5,929,961 A | 7/1999 | Nishi et al. |

(Continued)

FOREIGN PATENT DOCUMENTS

EP    0556855 A1    8/1993

(Continued)

OTHER PUBLICATIONS

Doyle, Jr., A2.2: Unexplained Voids, SID International Symposium, vol. XXVI, May 23-25, 1995.

(Continued)

*Primary Examiner* — Laura M. Lee
(74) *Attorney, Agent, or Firm* — William A. English; Vista IP Law Group LLP

(57) ABSTRACT

Apparatus and methods for resizing electronic displays are provided. The display includes a front plate, a back plate, a perimeter seal spacing the front and back plates apart, image-generating medium contained in an area between the plates, and polarizing layers and/or other films on the outer surfaces of the plates. A target portion of the display is identified, and a saw is passed along a cut line to create a channel that extends through the polarizer to the outer surface of the top plate. A scriber tool is passed along the cut line within the channel to create a scribe line in the outer surface of the top plate. The display is inverted, and the process repeated to cut a channel and scribe the bottom plate. The plates are broken along the scribe line, and a seal is applied along the exposed edge, which may penetrate between the plates.

28 Claims, 7 Drawing Sheets

U.S. PATENT DOCUMENTS

| | | | |
|---|---|---|---|
| 6,191,840 B1 | 2/2001 | Bon | |
| 6,204,906 B1 | 3/2001 | Tannas, Jr. | |
| 6,380,999 B1 * | 4/2002 | Tannas, Jr. | 349/153 |
| 2002/0118335 A1 * | 8/2002 | Tannas, Jr. | 349/187 |
| 2003/0184706 A1 * | 10/2003 | Watson | 349/187 |
| 2004/0074366 A1 * | 4/2004 | Choo et al. | 83/886 |
| 2005/0056127 A1 * | 3/2005 | Yamabuchi et al. | 83/13 |

FOREIGN PATENT DOCUMENTS

| | | | |
|---|---|---|---|
| GB | 2183073 | | 5/1987 |
| GB | 2330423 | * | 4/1999 |
| GB | 2330423 A | | 4/1999 |
| GB | 2381080 | * | 4/2003 |
| JP | 60146228 | | 8/1985 |
| JP | 61186941 | | 8/1986 |
| JP | 61210326 | | 9/1986 |
| JP | 2235026 | | 9/1990 |
| JP | 3293633 | | 12/1991 |
| JP | 08076074 | | 3/1996 |
| JP | 08122769 | | 5/1996 |
| JP | 08146444 | | 6/1996 |
| WO | WO 03/040049 | * | 3/2003 |
| WO | 03040049 | | 5/2003 |
| WO | 2006028445 | | 3/2006 |

OTHER PUBLICATIONS

High Performance Sealant for Display Manufacturing Processes Brochure.

Orkis, F-16 Retrofit Application, SPIE Proceedings Cockpit Displays, vol. 2219, Apr. 7-8, 1994.

Three Bond Products for the LCD Production Chart.

Dow Corning, A Selection Guide to Silicone Materials for High Technology Applications.

Loctite PCB Assembly Line Product Brochure.

Loctite Output 315 Product Information, Jun. 1999.

Vetter et al., Influence of Fabrication Process, Eurodisplay '90 Conference, Sep. 25-27, 1990.

Doyle, ARC-164 Liquid Crystal Void Investigation Meeting Minutes, Apr. 25-26, 1994 and Sep. 1993.

Tannas, Jr., Worldwide Availability of Avionics-Grade AMLCD Panels, Mar. 1994, pp. 1-23.

Tannas, Jr., Ruggedized AMLCD Solutions from Electronic Designs Inc., Jun. 1994, pp. 24-31.

Tannas, Jr., Ruggedizing a Commercial AMLCD, Jul. 1994, pp. 32-43.

Tannas, Jr., Liquid Crystal Displays: An Engineering Overview, Sep. 1995, pp. 44-45.

Tannas, Jr., Large High Resolution FPDs from Japan, Jun. 1996, pp. 46-50.

Tannas, Jr., Flat-Panel Displays: The Next Electronic Revolution?, Oct. 1997, p. 51.

Tannas, Jr., Laws for the Design of the Universal Cockpit Display, Apr. 1998, pp. 52-59.

Tannas, Jr., Application of Back-lit AMLCDs to Avionics, Apr. 1998, pp. 60-73.

Watson, David, et al., "Improvements in or Relating to Liquid Crystal Displays," PCT Publication WO99/19765, Apr. 22, 1999, and corresponding International Search Report.

* cited by examiner

APPARATUS AND METHODS FOR CUTTING ELECTRONIC DISPLAYS DURING RESIZING

RELATED APPLICATION DATA

This application claims benefit of provisional application Ser. No. 60/573,421, filed May 21, 2004, the entire disclosure of which is expressly incorporated by reference herein.

FIELD OF THE INVENTION

The present application is directed to apparatus and methods for resizing a liquid crystal display (LCD) or other electronic display, and, more particularly, for cutting and separating a desired portion of a display from an excess portion where the display includes one or more layers of polarizers, filters, and/or other films thereon.

BACKGROUND

An LCD or other electronic display is typically made of a top plate and a bottom plate with image-generating medium contained between the plates within a peripheral seal, and with electronics connected to the image-generating medium from the edges. The electronics control the image-generating medium through a matrix of row and column lines (in some displays with distributed electronics) and cause an image to appear by means of the electro-optical phenomenon of the material used in the image-generating medium. Each plate may include several layers of dissimilar materials, such as glass, plastics, polarizers, filters, compensators, optical coatings, electrical coatings, electronic circuits, adhesives, etc.

It has been suggested that a premanufactured display, e.g., a commercial-off-the-shelf (COTS) LCD, may be reduced in size by cutting the display at a desired location, resealing the portion to be saved, reestablishing the electronics as necessary, and reestablishing and/or enhancing the polarizer and/or other layers of the plates as necessary. Exemplary methods for resizing LCDs are described in U.S. Pat. No. 6,204,906 ("the '906 Patent"), which names the same inventor as the inventor of the present application. The entire disclosure of the '906 Patent is expressly incorporated by reference herein.

To separate a desired portion of a completed display from an excess portion of the display, the many layers of the display must be completely severed. Before cutting the glass plates of a display, it has been suggested to remove a strip of the overlying plastic layers (e.g., polarizers, filters, etc.) to access the underlying layers, particularly the glass plates themselves. To remove this strip, two cuts are made along the border between the desired and excess portions, one cut on each side of the intended cut line. The strip between the two cut lines may then be peeled away to expose the next layer to be cut, e.g., to expose the surface of the underlying glass plate. Alternatively, the overlying layers (e.g., polarizers, filters, etc.) may be removed entirely from the plates and replaced after the glass plates (or other layers) are cut, although this may increase the cost of the resized display and/or risks changing the performance and durability of the display.

SUMMARY OF THE INVENTION

The present invention is directed to apparatus and methods for resizing LCDs or other electronic displays, and, more particularly, to apparatus and methods for cutting and/or separating a target portion of a display from an excess portion, the display including one or more layers of polarizers, filters, and the like thereon.

In accordance with one embodiment, a method is provided for resizing an electronic display including top and bottom plates, and image-generating medium sealed between the top and bottom plates. The display includes one or more layers overlying the top plate, e.g., one or more of a polarizer, filter, adhesive, optical coatings, and the like (and optionally overlying the bottom plate as well). Initially, a cut line may be identified that defines a border between a target portion of the display (the portion intended for the new resized display) and an excess portion of the display (which may be discarded or reused).

A cutting tool may be passed along the cut line over the display to create a trench or other channel that extends through the one or more layers to a surface of the top plate. In one embodiment, a strip of the one or more layers may be removed in a single cut such that the cutting tool, e.g., a saw, removes sufficient material to expose the underlying outer surface of the top plate. Optionally, the cutting tool may include a vacuum or other tool, e.g., mounted behind the saw, to remove sawdust or other material dislodged when the channel is created.

A scriber tool may be passed along the cut line within the channel to create a scribe line in the surface of the top plate. If the bottom plate also includes one or more layers overlying a surface of the bottom plate, the process may be repeated to cut a channel in the one or more layers and scribe the bottom plate.

Optionally, a solvent may be delivered along the channel, e.g., to dissolve material from within the channel, e.g., debris from the one or more layers, adhesive, and the like, before the scriber tool is passed along the cut line. In addition, an absorbent material or other element may be passed along the cut line, e.g., after delivering the solvent, to collect or otherwise remove material from within the channel.

In one embodiment, at least two of these steps may be accomplished in a single pass, e.g., using a cutting or tool assembly carrying a plurality of tools. For example, a cutting assembly may be passed along the cut line above the top plate (and optionally successively above the bottom plate) that carries a cutting tool and a scriber tool aligned to successively cut and scribe the display. Alternatively, one or more of these steps may be performed successively, e.g., using separate tools that may be passed along the cut line. In a further alternative, one or more of these steps may be performed successively using a cutting assembly that includes multiple tools that may be quickly directed between active and inactive positions or otherwise interchanged.

After creating the channel and scribe line(s), the top plate (and/or the bottom plate) may be broken along the scribe line to separate the target portion from the excess portion. A seal may be applied along the exposed edge of the target portion, e.g., between the plates. Optionally, during the resizing process, it may be necessary or desirable to replenish or exchange the image-generating medium.

In accordance with another embodiment, an apparatus is provided for resizing an electronic display including top and bottom plates, and imaging-generating medium sealed between the top and bottom plates. At least the top plate (and optionally, the bottom plate) may include one or more layers overlying a surface of the top plate (and bottom plate). The apparatus may include a machine or other fixture for stabilizing the display while providing access to the top plate (and/or bottom plate). The apparatus may also include a cutting or tool assembly movable relative to the fixture, e.g., for cutting a display stabilized thereon. For example, the cutting assembly may include two or more tools, e.g., a cutting tool, a scriber tool, a nozzle or other device for delivering a solvent onto the display to dissolve material in the channel, and/or an absorbing or other element for removing the solvent and/or debris from the channel.

In exemplary embodiments, the cutting tool may be a saw for creating a channel through the one or more layers to the surface of the top plate (and bottom plate), and the scriber tool may be a scribe wheel for creating a scribe line in the surface of the top plate (and bottom plate). In one embodiment, the cutting tool may create a channel in a single pass having a width corresponding to a width of the saw, and the scriber tool may have a width smaller than the channel such that the scriber tool may contact the surface of the plate without requiring further removal of the polarizer and/or other overlying layer(s), i.e., between the remaining portions of the overlying layer(s).

Generally, the apparatus and methods of the present invention may accomplish the resizing of a display while minimizing cost and/or minimizing the impact on the display performance. In addition, it may be desirable to make the new cut and seal of a minimal width. This may make the periphery associated with the new cut line minimal. The cost may also be reduced if as many as possible of the original layers on the plates remain in their original location and reused. The performance may also be preserved if the desired display portion is disturbed as little as possible.

Other aspects and features of the invention will become apparent from consideration of the following description taken in conjunction with the accompanying drawings.

SUMMARY OF THE DRAWINGS

The drawings illustrate exemplary embodiments of the invention, in which.

DETAILED DESCRIPTION

In this application, COTS is an acronym for "Commercial Off-The-Shelf," FPD is an acronym for "Flat-Panel Display," LCD is an acronym for "Liquid Crystal Display," PDLC is an acronym for "Polymer-Dispersed Liquid Crystal," AMLCD is an acronym for "Active Matrix Liquid Crystal Display," TAB is an acronym for "Tape-Automated-Bonding," COG is an acronym for "Chip-On-Glass," UV is an acronym for "ultraviolet," VLSI is an acronym for "Very Large Scale Integration," and HDTV is an acronym for "High-Definition Television."

Figure 1A:
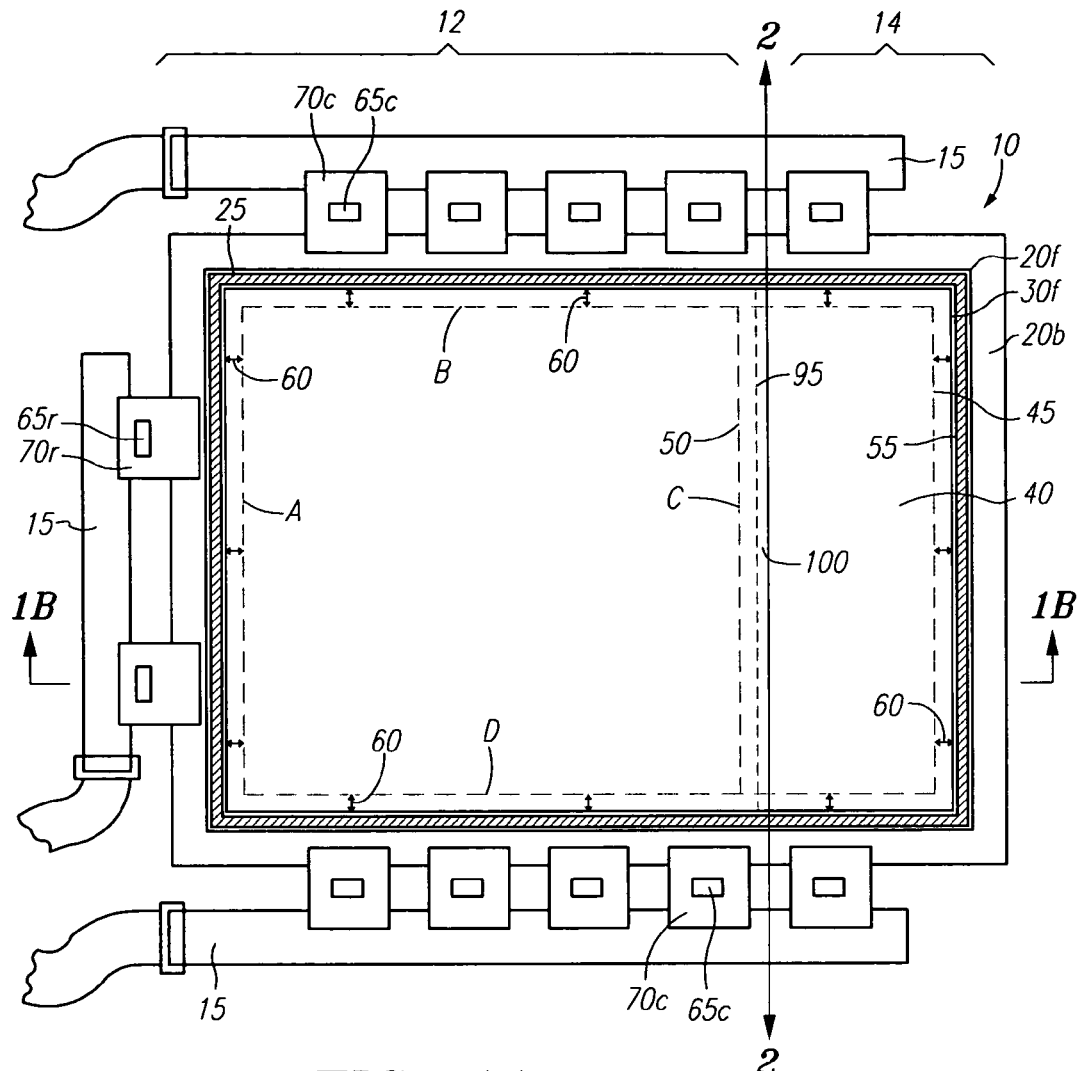
FIG. 1A is a plan view of a typical COTS AMLCD.
Figure 1B:
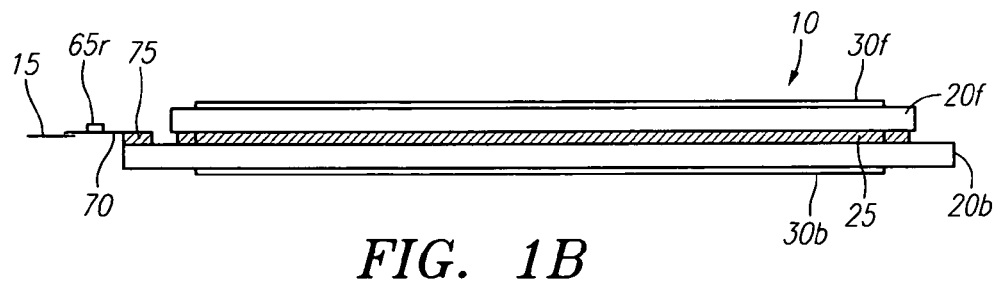
FIG. 1B is a cross-sectional view of the COTS AMLCD of FIG. 1A, taken along line 1B-1B, with column TABs removed from the cross-section for purposes of clarity.

Turning to the drawings, FIGS. 1A and 1B show a typical non-square (rectangular) COTS AMLCD 10, e.g., before resizing and/or other modification as described herein, but after disassembly from its original bezel, frame, and/or other associated hardware and electronics. For clarity, some of the external components associated with the display 10 (other than the circuit boards 15) are not shown, e.g., that may be bonded or otherwise attached to the plates 20. Such external components may be removed before or while customizing the display 10, as described elsewhere herein.

The display 10 generally includes a front plate 20f and a back plate 20b, e.g., made of glass, such as borosilicate or other hard glass. The plates 20 are held together by a perimeter seal 25, and may be further secured within a bezel (not shown), which, in turn, may be secured to a frame or other hardware (not shown), e.g., for attachment to the target location, e.g., in a cockpit panel of an aircraft. Polarizing films 30f and 30b, filters (not shown), image enhancement films (not shown), retardation films (not shown), viewing angle enhancement films (not shown), and/or other films may exist on the front and/or back outer surfaces of the plates 20.

Thus, each side of the display 10 generally includes two major layers, and possibly many minor layers. For example, the outer layer of each side may include a polarizer, e.g., made of plastic, along with several minor layers (e.g., filters, films, compensators, optical coatings, adhesives, etc.). As used herein, "polarizer" may be used generically to refer to the entire outer layer on each side of the display 10, even though the outer layer may include additional layers in addition to the polarizer (or even instead of a polarizer). The inner layer of each side of the display 10 may include a major layer, i.e., the glass plate, but may also include many minor layers (e.g., electrical circuitry, dielectrics, filters, etc., not shown) printed or otherwise provided on the plate 20, e.g., on an inner surface of the glass plate 20. As used herein, "plate" may be used generically to refer to the glass plate as well as the many minor layers carried by the glass plate.

As explained further below, each side of the display 10 may be cut using two different tools and/or methods for each major layer, and the minor layers may be cut when the respective major layers are cut. The minor layers may be relatively thin as compared to the major layers and, thus may be cut simultaneously when the major layers are cut.

Returning to FIGS. 1A and 1B, the original display image area 40 defined by the manufacturer of the COTS display 10 is indicated by dashed perimeter line 45. Dashed line 50 represents the desired right edge of the display image area 40 after customization, as described below. A light-blocking mask (not shown), e.g., an opaque coating, may be provided on at least one of the inner surfaces of the plates 20, e.g., covering a perimeter area around the display image area 40, and extending outwardly to a sufficient distance to serve its purpose. Typically, the distance may be up to the edge of the bezel, or to the inner edge 55 of perimeter seal 25, as indicated by arrows 60 in FIG. 1A. Without the mask, light escaping from the edge of the display image area 40 may distract a person viewing the display 10 and/or otherwise impair viewing an image on the display 10.

Row and column electronic drivers 65r and 65c respectively are bonded to TAB substrates 70r and 70c respectively, which in turn are bonded to the edges of the plates 20, e.g., using electrically-anisotropic adhesives known in the art. In avionics, bent TABs (not shown) may be used to save panel area. In addition or alternatively, the drivers 65 may be attached directly to the plates 20 as COGs. The TABs 70 may be bonded or soldered to circuit boards 15, and are electrically connected to external sources via connections 90 to circuit boards 15. COGs (not shown) may be electrically connected to the edges of the display plates 20, which may be electrically connected via ribbon cables to external sources (not shown). For simplicity, a few exemplary connections 90 are shown in FIG. 2A, although it will be understood that they may be provided as desired or needed.

Figure 2A:
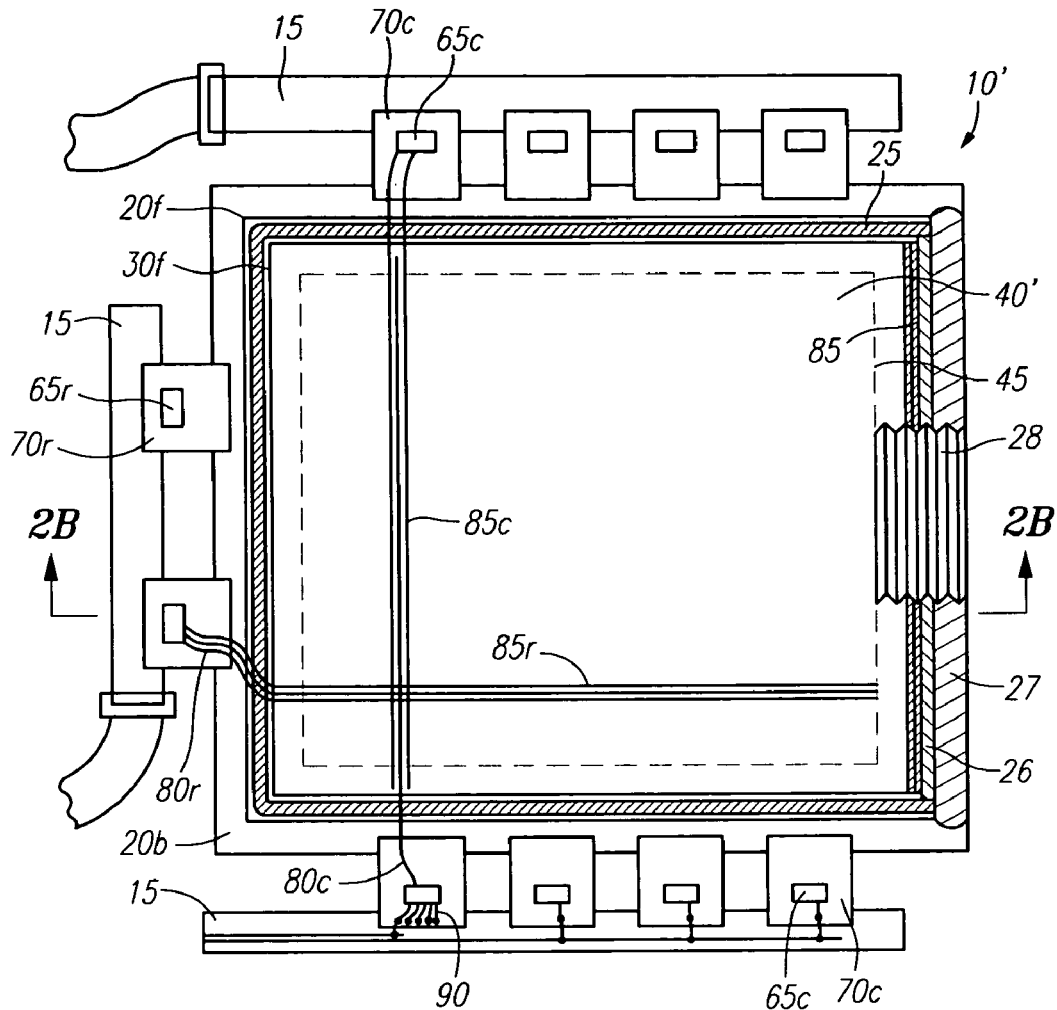
FIG. 2A is a plan view of a customized display made from the COTS AMLCD shown in FIG. 1A, by cutting along line 2-2 in FIG. 1, and then resealing a retained portion of the display.

The electronic drivers 65 may include VLSI circuits having corresponding external leads 80r and 80c that are electrically connected through perimeter seal 25 to row and column electric leads 85r and 85c, respectively (see FIG. 2A). Again for simplicity, only a few leads 80 from one row TAB 70r and two column TABs 70c are shown in FIG. 2A, but it is understood that each row TAB 70r and each column TAB 70c may have dozens or even hundreds of individual leads 80. The row and column electric leads 85 may be distributed throughout an image-generating medium, such as liquid crystal material (normally transparent) contained between the plates 20, as seen in FIG. 2A.

In addition to holding the plates 20 together, the perimeter seal 25 substantially isolates and protects the image-generating medium from the outside environment. In addition, precisely sized spacers (not shown) may be distributed throughout the image-generating medium. After conventional manufacturing, the region between the plates 20 may be maintained at a partial vacuum to draw the plates 20 against the spacers, e.g., to ensure that the distance between the plates 20 is maintained at a predetermined cell spacing or "cell gap," e.g., between about five (5) and six (6) micrometers, which is appropriate for the display 10 to operate normally. Although a COTS AMLCD is described, it will be appreciated that the tools and methods described herein may be used to customize or otherwise modify other electronic displays, such as passive matrix LCDs, plasma panels, organic LEDs, and the like.

Figure 2B:
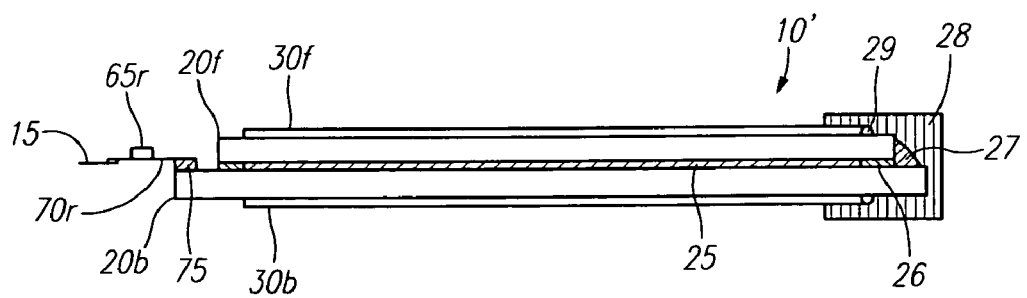
FIG. 2B is a cross-sectional view of the customized display of FIG. 2A, taken along line 2B-2B, with the column TABs removed from the cross-section for purposes of clarity.
Figure 3:
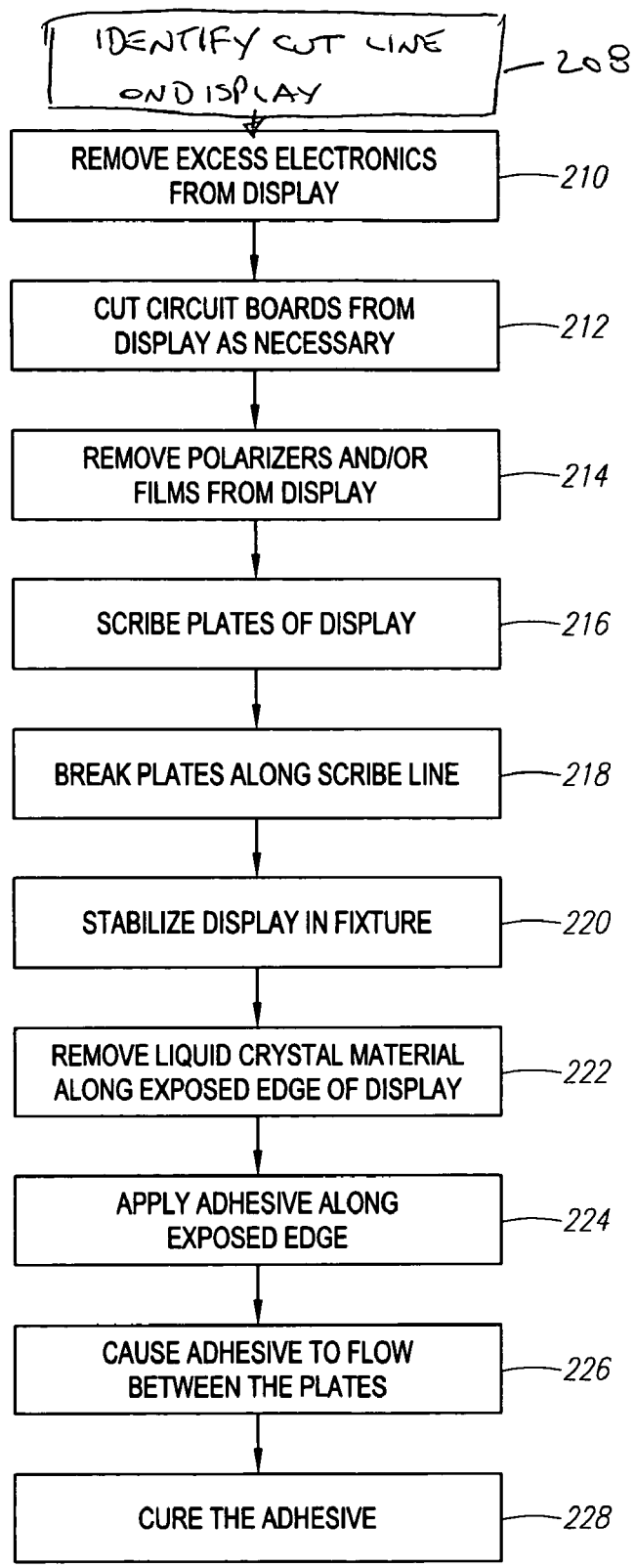
FIG. 3 is a flowchart showing an exemplary method for resizing or customizing an electronic display.

Turning to FIG. 3, an exemplary method is shown for resizing, customizing, or otherwise modifying an electronic display, such as the COTS display 10 of FIGS. 1A and 1B to create a customized display, such as the display 10' shown in FIGS. 2A and 2B. The COTS display 10 may be customized in varying degrees, as necessary or desired, and the examples provided herein are not to be viewed as setting forth required techniques unless specifically so stated. Further, although the steps are provided in a sequential order, it will be appreciated that the order in which the steps are performed may be varied. In addition, one or more of the steps may be eliminated and/or may be substituted with one or more of the steps from other methods described herein.

Initially, at step 208, a cut line may be identified, such as cut-line 2-2 in FIG. 1A, which may separate a target portion 12 of the COTS display 10 (e.g., corresponding to the portion to be retained to create the customized display 10') from an excess portion 14 (e.g., corresponding to the portion that may be discarded or saved for other purposes). In the example shown, the target portion 12 is substantially square, e.g., corresponding to a standard shape of a region of an airplane control panel (not shown). Alternatively, the target portion 12 may have a rectangular, triangular, curved, or other more complicated shape (e.g., which may include cutting one or more additional portions from the target portion 12, as described further elsewhere herein).

At step 210, the display 10 may be removed from its frame assembly, e.g., if a fully assembled display apparatus is being resized. This may include removing any excess electronics that may interfere with a portion of the resizing procedure, and/or that may be modified or replaced with other electronics.

At step 212, one or more circuit boards, e.g., circuit boards 15 and/or TABs 70, of the display may be cut, e.g., using hand or power tools, such as a hand shear, power saw, and the like. As shown in FIGS. 1A and 2A, the circuit board 15 has been cut generally parallel to cut line 2-2. Optionally, any cut edges may trimmed or otherwise treated, e.g., using a mill, router, sandpaper, and the like. If the cut-line 2-2 requires cutting through an electronic driver 65, the driver 65 may need to be relocated and/or replaced. Alternatively, the circuit board(s) 15, TABs 70, and/or drivers 65 may be removed entirely, e.g., if new flexible or rigid circuits boards are to be attached to the customized display 10.'

At step 214, one or more polarizers (and/or other films) 30 may be removed from at least a portion of the display 10, e.g., on the exposed surfaces of one or both plates 20 of the display 10. For example, in one embodiment, the polarizer(s) 30 may be scored, e.g., inside the cut-line 2-2, to create a target polarizer portion overlying the target portion, which may be retained during the customization process. The remainder or excess polarizer portion (e.g., overlying the cut-line 2-2 and the excess portion 14 of the COTS display 10) may then be removed and/or discarded. In another embodiment, the polarizer(s) 30 may be scored along two lines on either side of the cut-line 2-2, and the resulting strip may be removed to provide access to the underlying plate(s) 20. Alternatively, the display 10 may not include any polarizers or films, and this step may be omitted.

Figure 4A:
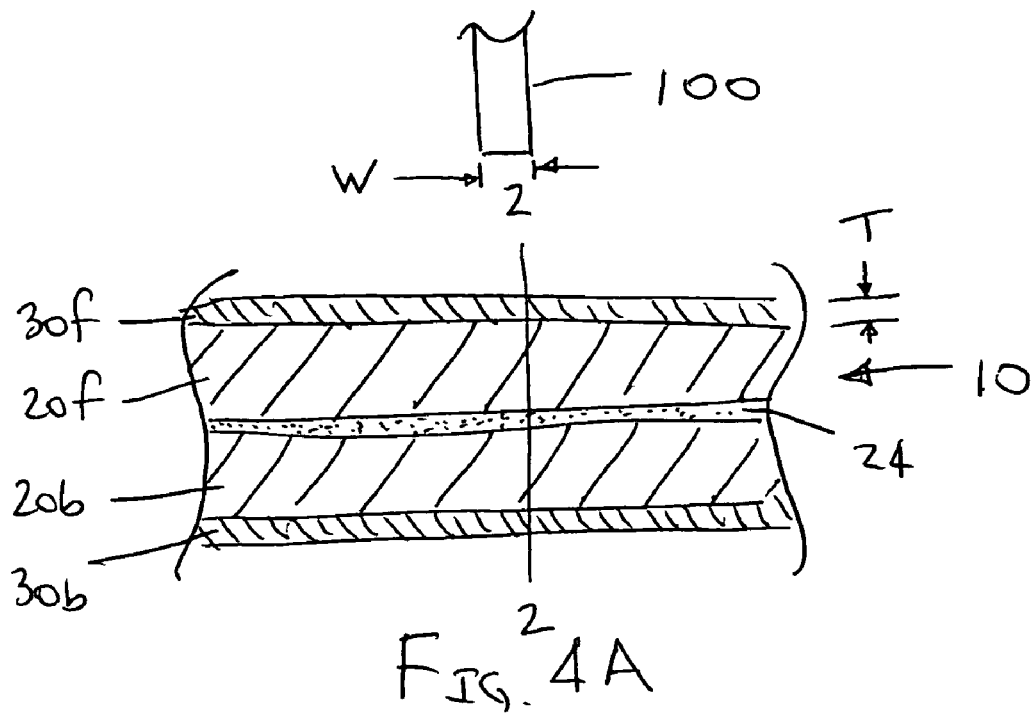
FIGS. 4A and 4B are cross-sectional details of the display of FIGS. 1A and 1B across the cut-line 2-2, showing a channel being cut through the polarizer layers using a saw.
Figure 4B:
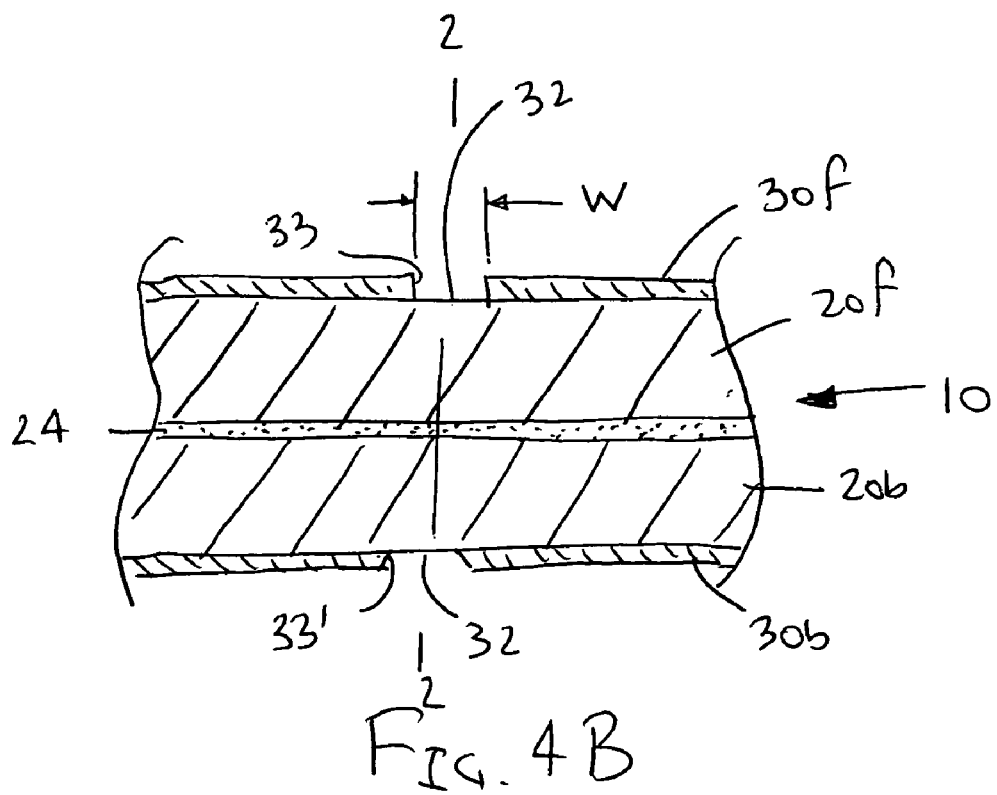

Turning to FIGS. 4A and 4B, in still another embodiment, a portion of the polarizer(s) 30 immediately overlying the cut-line 2-2 (or offset to either side of the cut-line 2-2, if desired) may be removed to create a narrow trench or channel 32 through the polarizer(s) 30 to the surface of the plate(s) 20. In exemplary embodiments, the resulting channel 32 may have a width "W" of about 1.25 millimeters (0.050 inch) or less, and/or less than about 0.030 inch (0.75 mm). The channel 32 may be centered over the intended cut line 2-2, as shown in FIG. 4B. Alternatively, the channel 32 may be offset slightly to one side or the other of the cut line 2-2 as long as the surface of the plate 20 along the cut line 2-2 is exposed.

As shown in FIG. 4A, the polarizer(s) 30 may be sawed using a fine-toothed round saw 100 rotated using an electric motor (not shown). The saw 100 may be mounted to a machine tool assembly (not shown) and guided along the display 10 at a proper orientation and/or depth, and with sufficient saw action to remove substantially all of the polarizer material completely down to the surface of the plate 20. For example, the saw 100 may have a width corresponding to the desired width of the channel "W" or may have a width slightly less than "W."

The saw 100 may be drawn precisely along the cut line 2-2 at a depth substantially equivalent to a thickness "T" of the polarizer 30 to cut through and expose the surface of each of the plates 20. In this embodiment, the channel 32 may be created in a single pass over each side of the display 10. The depth of the saw 100 may be controlled precisely such that the saw 100 cuts through the polarizer 30 and passes along and contacts the outer surface of the plate 20 without scoring, abrading, or otherwise damaging the plate 20. Alternatively, the channel 32 may be created using several passes, each pass removing an additional layer of the polarizer 30 and approaching the surface of the plate 20, e.g., until the surface of the plate 20 is exposed. As shown in FIG. 4B, the resulting channel 32 may have sides 33 that extend substantially perpendicular to the plate surface, as shown for the front plate 20f, or may have sides 33' that extend laterally from the plate surface, as shown for the back plate 20b.

Figure 7:
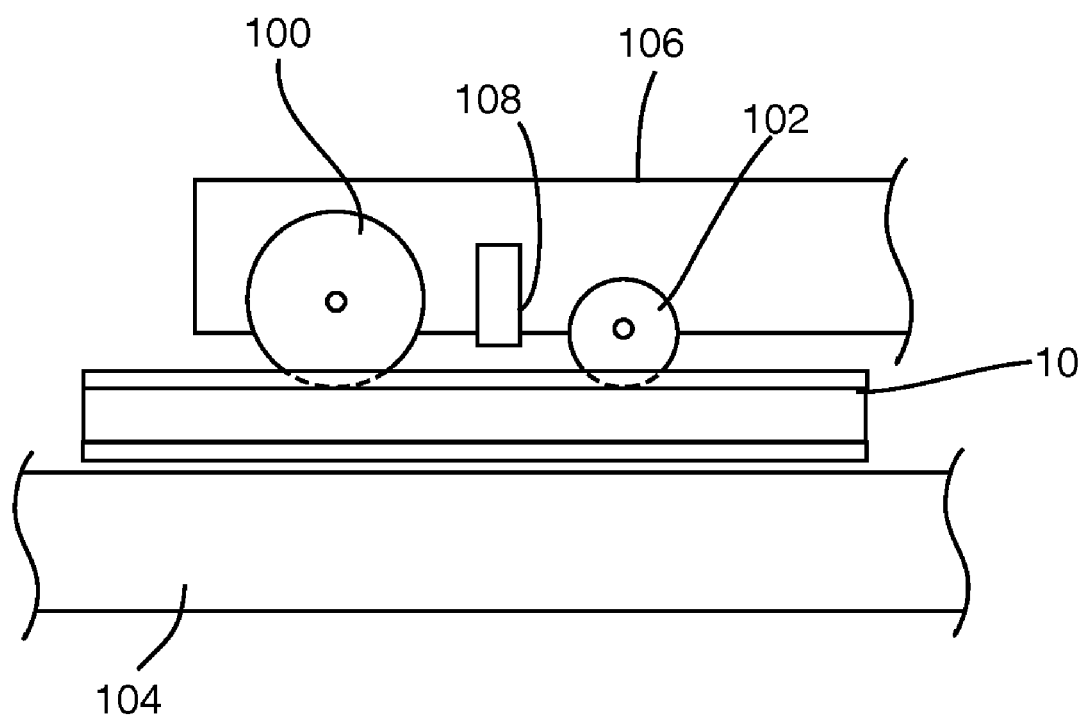
FIG. 7 is a side view of an arm of a tool assembly carrying a saw, a tool for cleaning residue, and a scribe wheel positioned over a display mounted to a fixture.

Optionally, as shown in FIG. 7, the display 10 may be mounted on a vacuum chuck or other fixture 104, e.g., to stabilize and/or otherwise secure the display 10 while the channel 32 is created on one (or each) side of the display 10. The saw 100 may be carried on a machine tool assembly (not shown), which, optionally, may include one or more additional tools, as described further below. In one embodiment, the saw 100 may be carried on a movable arm 106 of the machine tool assembly that may be moved relative to the fixture. Alternatively, the saw 100 may be stationary, and the fixture may hold and move the display 10 under the saw 100.

The machine tool assembly may be secured on or adjacent the fixture, e.g., such that motion of the machine tool assembly relative to the fixture may be controlled precisely. A computer or other processor may precisely move and/or otherwise control the machine tool assembly and/or fixture, e.g., along X and Y axes (along the plane of the fixture), and optionally along a Z axis (away from or towards the plane of the fixture). Alternatively or in addition, the machine tool assembly and/or fixture may be set and/or manipulated manually.

After the channel 32 is created, the surface of the display 10 may be cleaned along the cut line 2-2. For example, any sawdust, remaining film adhesive, and/or other residue may be removed, e.g., to clear the exposed surface of the plate 20. For example, a vacuum line, a cleaning wheel carrying a sponge, cloth, and the like, a nozzle for a solvent or other liquid, and/or other tool 108 may be directed along the cut-line 2-2 to remove any such residue. Such tool(s) 108 may be carried by the arm 106 carrying the saw 100, e.g., such that the tool(s) 108 follow behind the saw 100 to clean the channel 32 as it is created, e.g., as shown in FIG. 7.

Alternatively, the channel 32 may be manually cleaned or otherwise prepared after being creating. For example, any film adhesive remaining in the channel 32 may be cleaned, e.g., using a cotton swab, fabric, sponge, and the like, alone or along with a solvent, such as 91% isopropyl alcohol solution. This procedure may be repeated on both sides of the display 10 if polarizers 30 are provided and a channel 32 created on both sides.

Using these methods, the original polarizer(s) 30 may remain intact over a target display image area 40' while still providing unobstructed access to the plates 20, e.g., for cutting or otherwise separating portions of the plates 20. For example, in FIG. 1A, the target display image area 40' of the target portion 12 is defined by a rectangle (or square) A-B-C-D, and the polarizer(s) 30 should remain intact at least over this area. In addition, the polarizers 30 over the cut line 2-2 may be removed without substantial risk of damaging the surface of the plates 20, which may prevent or create problems scribing the surface of the plates 20.

Figure 5:
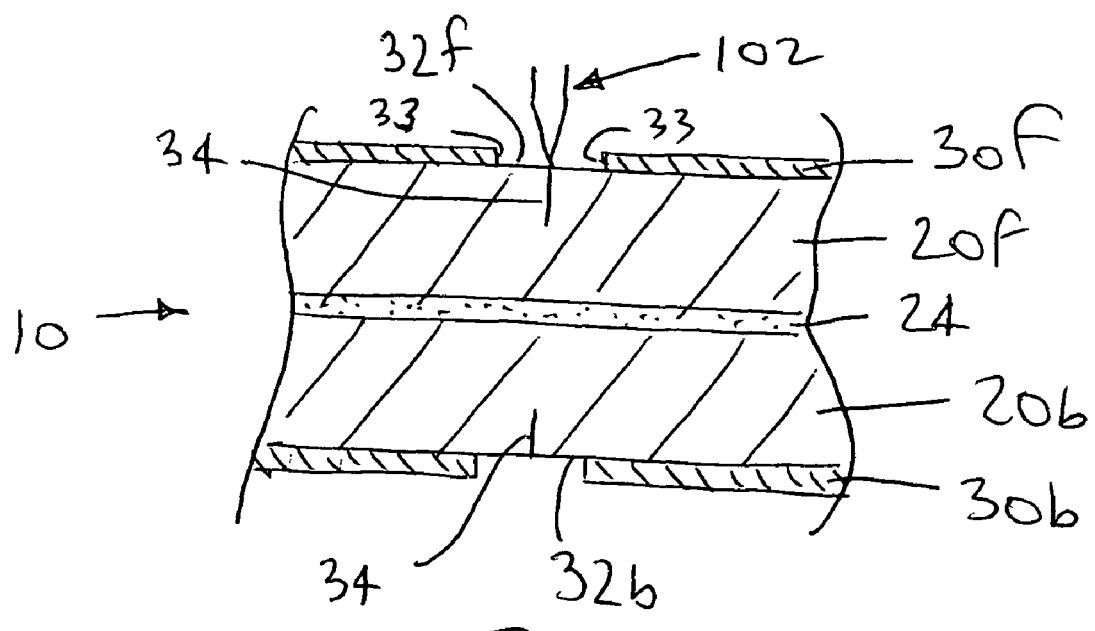
FIG. 5 is a cross-sectional view of the display of FIGS. 4A and 4B, showing a vent being scribed into the plates within the channel using a scribe wheel.

Returning to FIG. 3, at step 216, one or both plates 20 of the display 10 may be scribed along the intended cut line 2-2. In one embodiment, shown in FIG. 5, the plates 20 may be scribed with a scribe wheel 102 along the intended cut line 2-2 to create a vent 34. As shown, the channel 32 should have sufficient width "W" to accommodate passing the scribe wheel 102 between the side walls 33 of the channel 32 and against the surface of the plate 20. The parameters for scribing using the scribe wheel 102, i.e., scribing speed and pressure, are similar to those used in the LCD industry for scribing glass plates of LCDs.

In one embodiment, the scribe wheel 102 may be provided on a separate tool than the saw 100 used to create the channel 32. For example, the display 10 may be moved to another work station including a vacuum chuck or other fixture, and the scribe wheel 102 may be moved along the cut line 2-2 using similar apparatus and methods described above for the saw 100. Alternatively, as shown in FIG. 7, the saw 100 for cutting the polarizer(s) and the scribe wheel 102 may be mounted on the same tool head 106, e.g., such that the cutting and scribing steps may be completed successively in one pass along each plate of the display. The relative positions of the saw 100 and scribe wheel 102, e.g., in the Z axis, may be fixed to allow the channel 32 to be created first and the vent 34 to be created immediately behind the saw 100. Optionally, also as shown in FIG. 7, one or more cleaning tools 108 (such as those described above) may be provided between the saw 100 and the scribe wheel 102 in this alternative to clean the channel 32 before creating the vent 34.

In another alternative, the scribe wheel 102 and/or saw 100 may be provided on a single tool assembly, but may be lowered successively when needed, e.g., using a pneumatic, hydraulic, mechanical, or other actuators that control the positions of the tools along the Z axis. Thus, the saw 100 may be lowered and used to create the channel 32, whereupon the saw 100 may be retracted and the scribe wheel 102 lowered and used to create the vent 34.

The vents 34 themselves do not separate the target portion 12 of the display 10 from the excess portion 14. Rather, the vents form the beginning of a crack that may be propagated into the glass plates 20, as described further below. Thus, after creating the channels 32 and vents 34, the display 10 may be handled or moved, if necessary, without risk of damaging the display 10 or LC material escaping from within the display 10.

Returning to FIG. 3, at step 218, the display 10 may be broken along the scribe line(s). For example, the display 10 may be removed from the vacuum chuck or other fixture used to create the channels 32 and/or vents 34, and placed on a flat plate of glass and the like (not shown). A strip of material, e.g., a 0.008 inch thick silicone or rubber strip (also not shown), may be placed on the flat plate before the display 10 such that the cut line 2-2 is substantially parallel to the rubber strip but offset to one side, e.g., about fifty (50) millimeters (two (2) inches). The cut line 2-2 of the upper plate may then be stroked with a cotton swab or other tool at moderate pressure, e.g., to cause the lower plate of the display 10 to break along the scribe line. The display 10 may be turned over, placed upon the flat plate over the rubber stripe and aligned in a similar manner, and the other plate (now exposed) may be stroked in a similar manner, to break the (now) lower plate along the scribe line. Thus, the display 10 may be separated into multiple pieces, e.g., into a target portion and an excess portion.

If the plates are not broken after a single pass, these steps may be repeated, as necessary, on one or both sides of the display, until the display is separated. Generally, only one side of the display will break along the scribe line at a time (i.e., the lower plate opposite the upper plate being stroked). However, during some procedures, both sides may break simultaneously along the scribe lines. In addition, one or both plates may break spontaneously during the scribing operation, thereby omitted one or both of the stroking steps. Alternatively, the rubber strip may be replaced with a continuous sheet of flexible material under the display, and the display may be broken, e.g., using a tool that uniformly strikes the display along the scribe line, such as the tools used by Villa Precision for breaking glass done in the glass cutting industry.

With additional reference to FIGS. 1A and 1B, when the display 10 breaks into the target and excess portions 12, 14, the plates 20 of the display 10 may expand, e.g., along the exposed edges of the target and excess portions 12, 14. As explained above, this may occur because the region between the plates 20 of the display 10 may be at a reduced pressure, e.g., substantially at a vacuum. When the display 10 is broken or otherwise separated along the scribe line(s), atmospheric pressure may enter the region between the plates 20, thereby causing the plates 20 to separate or otherwise expand away from one another a distance greater than the performance spacing.

Returning to FIG. 3, at step 220, the target portion 12 of the display 10 (the portion to be used for the resized display) may be placed in a pressure plate tool, e.g., to stabilize the target portion 12 in preparation for sealing. Alternatively, the display 10 may be mounted in a pressure plate tool after creating the channels 32 and vents 34 but before separating the target portion 12 from the excess portion 14, as explained further below.

Figure 6:
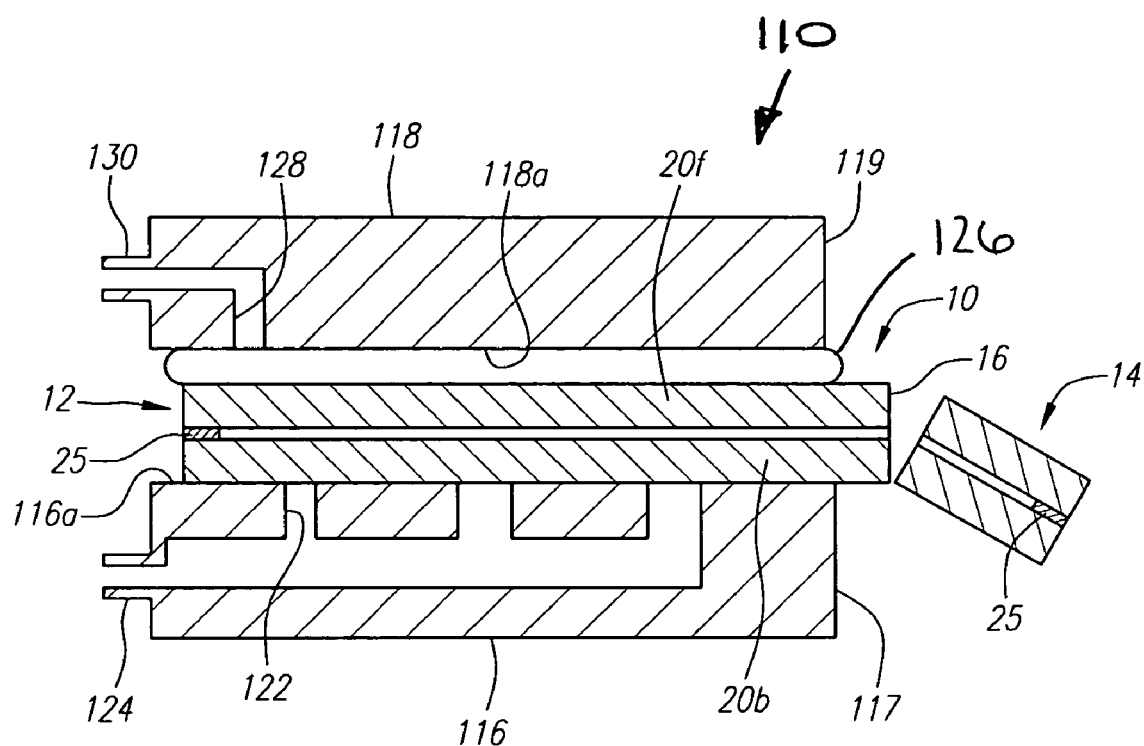
FIG. 6 is a cross-sectional view of a fixture including a pair of pressure plates holding the display of FIGS. 4A-5 between the pressure plates.

For example, turning to FIG. 6, the display 10 may be secured within a pressure plate tool 110 before separating the target portion 12 and the excess portion 14. Generally, the pressure plate tool 110 includes two substantially rigid plates 116, 118. In one embodiment, one of the plates 116 may include a plurality of apertures 122 on an inner surface 116a of the plate 116 that communicates with a port 124. The port 124 may be coupled to a vacuum source (not shown), such that the first plate 116 provides a vacuum chuck.

The second pressure plate 118 may include an inner surface 118a against which a bladder 126 is secured or otherwise disposed. The second pressure plate 118 may include one or more apertures 128 (one shown in FIG. 6 for illustration only) within the interior of the bladder 1226 that communicate with a port 130. The port 130 may communicate with a pump, a compressed gas container, or other source of inflation media (not shown), thereby allowing inflation media, e.g., air, gas, oil, water, and the like, to be delivered into an interior of the bladder 126 to expand the bladder 126. The bladder 126 may be formed from an elastic material or a substantially inelastic material, e.g., transparent silicone rubber, having a thickness of about 0.80 millimeter (1/32 inch). Optionally, both plates 116, 118 may include bladders 126, if desired.

With the plates 116, 118 separated or otherwise opened, the target portion 12 of the display 10 may be placed on the inner surface 116a of the first pressure plate 116. Optionally, the first pressure plate 116 may include one or more alignment pins (not shown) extending from the inner surface 116a for placing the target portion 12 in a predetermined orientation on the inner surface 116a. For example, the pins may ensure that the display 10 is positioned with the excess portion 14 of the display 10 disposed beyond edge 117 of the first pressure plate 116, e.g., with the cut line 2-2 (not shown) aligned along the upper edge 117.

Once the display 10 is placed and/or properly positioned against the inner surface 116a, the vacuum source may be activated to substantially secure the target portion 12 against the first pressure plate 116. The second pressure plate 118 may then be mounted to the first pressure plate 116, e.g., using one or more bolts or other fasteners (not shown). Thus, the display 10 may be stabilized or otherwise maintained between the pressure plates 116, 118. In one embodiment, the fasteners or alignment pins may fix the second pressure plate 118 spaced apart from the first plate 116 by a predetermined distance, e.g., about five millimeters (0.200 inch).

The bladder 126 may then be inflated to a first predetermined pressure, e.g., between about one and three pounds per square inch (1-3 psi). The first predetermined pressure may be sufficient to maintain the plates 20 of the display 10 at a predetermined spacing. For example, the first predetermined pressure may maintain the plates 20 of the display 10 at the desired cell spacing for the display 10 to operate normally, as described above. Stated differently, the first predetermined pressure may be sufficient to hold the plates 20 against the internal spacers (not shown) of the display 10 without improperly compressing or otherwise damaging the spacers. Thus, the first predetermined pressure may prevent the plates 20 from moving away from one another, e.g., once the excess portion 14 is separated from the target portion 12, and the interior region of the target portion 12 is exposed to ambient pressure.

If the plates 20 have separated, e.g., because the target portion 12 has already been separated from the excess portion 14, the pressure from the bladder 126 may return the plates 20 to their original operational spacing. The bladder 126 may distribute the pressure substantially uniformly over the surface of the target portion 12 of the display 10, e.g., to ensure that the spacing between the plates 20 remains substantially uniform over the area of the target portion 12.

If the display 10 has not yet been broken, the excess portion 14 of the display 10 may extend beyond the edges 117, 119 of the pressure plates 116, 118. The excess portion 14 may be bent to cause the plates 20 to break along the scribe lines created along the cut-line 2-2. For example, a torque or other substantially uniform force may be applied, e.g., manually, to the excess portion 14 substantially perpendicular to the plane of the plates 20 to break each of the plates 20.

With the excess portion 14 separated, the interior region of the target portion 12 is exposed to atmospheric pressure, which may be substantially higher than the original pressure within the interior region of the target portion 12. Because the target portion 12 is stabilized between the pressure plates 116, 118, e.g., using the bladder 126, the plates 20 remain substantially at the predetermined cell spacing. Without the pressure plates 116, 118, the tendency of the plates 20 would be to separate as air is drawn therebetween, which may impair or destroy the effectiveness of the target portion 12 to display images. Because of the pressure plates 116, 118, the plates 20 remain positioned against the spacers within the interior region to preserve the predetermined cell spacing.

With the excess portion 14 removed, the target portion 12 now has an exposed edge 16, as shown in FIG. 6. Alternatively, if the excess portion 14 was separated before placing the target portion 12 within the plates 116, 118, the same procedure may be used to return the plates 20 of the display 10 to their original spacing. At this point, one or more seals may then be applied along the exposed edge 16 to substantially seal the interior region of the target portion 12 and/or ruggedize the target portion 12 to create a customized display, such as the display 10' shown in FIGS. 2A and 2B.

Returning to FIG. 3 and with continuing reference to FIG. 6, steps 222-228 may be followed to apply a first seal 26 along the exposed edge 16 that extends between the plates 20. First, at step 222, a small amount of liquid crystal material may be ejected or otherwise removed from between the plates 20 of the display 10 along the exposed edge 16, e.g., to create a space between the plates 20 for receiving an adhesive or other sealant. For example, the pressure in the bladder 126 may be increased slightly, e.g., by about one to three psi, to compress the plates 20 of the display 10 slightly together from their intended performance spacing, thereby causing a small amount of LC material to be forced out along the exposed edge 16.

The exposed LC material may be removed from along the exposed edge 16, e.g., using a cotton swab, fabric, or other absorbent or nonabsorbent material. In addition, the exposed edge 16 may be cleaned and/or otherwise treated. Alternatively, the LC material may be removed from between the plates 20, e.g., by wicking, draining, and the like, similar to the methods described in the '906 patent incorporated by reference above.

At step 224, an adhesive, e.g., a bead of flowable adhesive, may then be applied along the exposed edge 16, e.g., while the target portion 12 is held in a vertical position. In an exemplary embodiment, the adhesive may be sufficiently flowable to allow the adhesive to be applied as a bead from a container, but may have sufficient viscosity to remain in a bead without flowing off of the exposed edge 16. Alternatively, the adhesive may have a relatively low viscosity, e.g., to allow it to flow inwardly between the plates 20, and/or to fill any empty space in the target portion 12 between the plates 20 and the liquid crystal material remaining between the plates 20, as described further below. A wetting and/or thinning agent may be used, if it is desirable to reduce the viscosity of the adhesive. Exemplary adhesives that may be used include UV curing acrylic adhesives with nominal viscosity, epoxies, and urethanes.

At step 226, the pressure in the bladder 126 may be reduced, e.g., to about one pound per square inch gauge pressure, allowing the adhesive to be drawn into the plates 20 (i.e., penetrate and enter between the plates 20) along the exposed edge 16. For an adhesive such as Loctite 349, it may require several minutes for the adhesive to penetrate sufficiently between the plates 20. For example, it may take about four (4) minutes for the adhesive to penetrate a distance of at least about 0.040 inch in between the plates 20. The penetration distance is generally proportional to the time allowed and inversely proportional to the increment of pressure reduction. As the pressure in the bladder 126 is reduced, the plates 20 may separate, thereby increasing the volume of the interior region, and drawing at least some of the adhesive between the plates 20 (to preserve the volume of material within the interior region).

In an exemplary embodiment, the plates 20 may be returned to the original predetermined cell spacing as the pressure is reduced. Thus, the volume of adhesive drawn between the plates 20 may be substantially the same as the volume of liquid-crystal material that is ejected from between the plates 20.

At step 228, after the adhesive has penetrated between the plates 20, the adhesive may be cured by appropriate methods to complete resizing the customized display, such as the display 10' shown in FIGS. 2A and 2B. For example, for a UV-curable adhesive, the target portion 12 may be exposed to ultraviolet light for sufficient time to substantially cure the adhesive between the plates, e.g., for at least about thirty seconds to two minutes depending upon the intensity of the UV and the sensitivity of the adhesive. Optionally, a UV curing lamp(s) and/or heater(s) (not shown) may be mounted in a pressure chamber of the pressure plate tool 110 to facilitate curing. Alternatively, other adhesives may be utilized that are cured using heat and/or pressure.

Optionally, the display 10' may be outgassed either before or after curing the adhesive. Exemplary apparatus and methods for applying a seal to the exposed edge 16 and/or for outgassing the display 10' are disclosed in International Application No. PCT/US2004/028563, filed Sep. 1, 2004, the entire disclosure of which is expressly incorporated by reference herein.

If desired, any excess adhesive disposed along the exposed edge 16 may be removed, e.g., wiped away before the adhesive is cured, or cut, scraped away, or otherwise removed, e.g., using chemicals or mechanical devices, after the adhesive is cured. Alternatively, the excess adhesive may remain along the sealed exposed edge 16. For example, an excess amount of adhesive may be added to the display 10' to be used during subsequent assembly or other preparation of the final product. Such excess adhesive material may be contoured and shaped, e.g., by molding and the like, to facilitate interfacing with a bezel (not shown) and/or otherwise optimize the display design.

After curing, the customized display 10' may be removed from the pressure plate tool 110, and cleaned as necessary and/or tested. Optionally, another portion (or portions) of the customized display 10' may be cut and sealed using similar methods to further customize the display 10.' If desired, one or more additional seals may be added to the customized display 10,' along the now-sealed exposed edge 16 and/or along one or more of the additional edges. For example, a second seal 27 may be added, as desired, and then outgassed and/or cured as necessary. The second seal 27 may be a silicone or other material, e.g., applied to minimize the penetration of humidity and/or other contaminants into the liquid crystal material inside the cell, e.g., when the display 10' subjected to its operating environment. Optionally, the second seal 27 may have black ink, dye, and/or other pigment added thereto to produce a substantially black or other opaque color, and may be applied up to the outer perimeter of the target display image area 40', to prevent back light from passing through the display 10' around the outer edges of the target display image area 40.'

In addition or alternatively, an optional mask or third seal 28 may be added to the newly-exposed plate edges, e.g., over the seal 27, and/or applied up to the outer perimeter of the target display image area 40.' The mask 28 is shown partially broken away in FIG. 2A. It should be dark, e.g., black, and may be tape, ink, sealant, adhesive, plastic, and/or any other suitable material. At least one of the second seal 27, or the optional mask 28 may be used to replace any of the original mask (not shown) removed during the customization process. Additionally, the mask 28 may be placed around the entire perimeter of the cell, e.g., substantially overlying the original perimeter seal 25 and original mask. The third seal or mask may cover part of the active area of the customized display 10' that is not used or desired to be seen be the user in the final implementation. Methods for applying such second and/or third seals 27, 28 are described in the '906 Patent, incorporated by reference above.

Additionally, though the examples used herein generally refer to customizing COTS AMLCDs into square displays (e.g., for avionics applications), the concepts are equally applicable to other types of LCDs or other display technologies, and for other industrial applications including those requiring other customized shapes. Furthermore, though the examples used show only one set of row TABs and two sets of column TABS, in practice that may be switched, or there may be two sets of each, and the quantity of each may vary, all as is desired or needed for a specific application.

The processes described herein may be automated and refined to include several tools, and operations, e.g., operating in one or more passes to complete multiple functions, such as spraying with a cleaning agent or other solvent, rubbing (e.g., with an absorbent material and/or squeegee) to remove adhesive or other debris, drying with an air jet, vacuuming to remove particles, brushing to clean the surface and/or the tools, and the like.

While the invention is susceptible to various modifications, and alternative forms, specific examples thereof have been shown in the drawings and are herein described in detail. It should be understood, however, that the invention is not to be limited to the particular embodiments or methods disclosed, but to the contrary, the invention is to cover all modifications, equivalents and alternatives falling within the scope of the appended claims.

I claim:

1. A method for resizing an electronic display including top and bottom plates, and imaging-generating medium sealed between the top and bottom plates to define a display image area of the display, the display comprising one or more layers overlying an outer surface of the top plate, the method comprising:

identifying a cut line overlying the display image area and defining a target portion and an excess portion of the display;

passing a fine-toothed round saw along the cut line over the display such that the saw removes polarizer material and creates a channel having a width "W" that extends through the one or more layers to the outer surface of the top plate without cutting into the outer surface of the top plate, the saw having a width corresponding to the width "W" or slightly less than "W"; and passing a scriber tool along the cut line within the channel to create a scribe line in the outer surface of the top plate.

2. The method of claim 1, further comprising breaking the top plate along the scribe line to at least partially separate the target portion from the excess portion.

3. The method of claim 1, wherein the bottom plate comprises one or more layers overlying an outer surface of the bottom plate, the method further comprising:

passing the saw along the cut line over the display such that the saw removes polarizer material and creates a channel having a width "W" that extends through the one or more layers to the outer surface of the bottom plate without cutting into the outer surface of the bottom plate; and passing a scriber tool along the cut line within the channel to create a scribe line in the outer surface of the bottom plate.

4. The method of claim 3, further comprising breaking the top and bottom plates along the scribe line to completely separate the target portion from the excess portion, thereby creating an exposed edge wherein the image-generating medium sealed between the top and bottom plates is exposed along the exposed edge.

5. The method of claim 4, further comprising applying a seal along the exposed edge.

6. The method of claim 5, wherein the seal is applied such that the seal extends in between the plates along the exposed edge.

7. The method of claim 1, further comprising cleaning the channel before passing the scriber tool along the cut line.

8. The method of claim 7, wherein cleaning comprises at least one of delivering a solvent along the channel to dissolve material from within the channel and directing a tool along the channel to remove material from within the channel.

9. The method of claim 7, wherein at least two of the steps of passing a saw, passing a scriber tool, and cleaning the channel are accomplished in a single pass of a cutting assembly along the cut line.

10. A method for resizing an electronic display including top and bottom plates, and imaging-generating medium sealed between the top and bottom plates, the display comprising one or more layers overlying an outer surface of the top and bottom plates, the method comprising:

identifying a cut line defining a target portion and an excess portion of the display;

passing a round saw along the cut line over the display such that the saw removes substantially all of the polarizer material below the saw down to the outer surface of the top plate and creates a channel having a width "W" that extends through the one or more layers to the outer surface of the top plate without cutting into the outer surface of the top plate, the saw having a width corresponding to the width "W" or slightly less than "W";

passing a scriber tool along the cut line within the channel to create a scribe line in the outer surface of the top plate;

passing a saw along the cut line over the display such that the saw removes substantially all of the polarizer material below the saw down to the outer surface of the bottom plate and creates a channel having a width "W" that extends through the one or more layers to the outer surface of the bottom plate without cutting into the outer surface of the bottom plate;

passing a scriber tool along the cut line within the channel to create a scribe line in the outer surface of the bottom plate;

breaking the top and bottom plates along the scribe line to separate the target portion from the excess portion to create an exposed edge; and applying a seal along the exposed edge.

11. The method of claim 10, wherein the seal is applied such that the seal extends in between the plates along the exposed edge.

12. The method of claim 10, further comprising cleaning the channel before passing the scriber tool along the cut line.

13. The method of claim 12, wherein cleaning the channel comprises at least one of delivering a solvent along the channel to dissolve material from within the channel and directing a tool along the channel to remove material from within the channel.

14. The method of claim 13, wherein at least two of the steps of passing a saw, passing a scriber tool, and cleaning the channel are accomplished in a single pass of a cutting assembly along the cut line.

15. A method for resizing an electronic display including top and bottom plates, and imaging-generating medium sealed between the top and bottom plates, the display comprising one or more layers overlying an outer surface of the top plate, the method comprising:

identifying a cut line defining a target portion and an excess portion of the display;

passing a cutting assembly along the cut line in a single pass such that a round saw on the cutting assembly removes substantially all of the polarizer material below the saw down to the outer surface of the top plate without scoring, abrading, or otherwise damaging the top plate and creates a channel having a width "W" that extends through the one or more layers to the outer surface of the top plate, and a scriber tool on the cutting assembly passes along the cut line within the channel to create a scribe line in the surface of the top plate.

16. The method of claim 15, further comprising breaking the top plate along the scribe line to at least partially separate the target portion from the excess portion.

17. The method of claim 15, wherein the bottom plate comprises one or more layers overlying an outer surface of the bottom plate, the method further comprising passing the cutting assembly along the bottom plate in a single pass such that the saw creates a channel having a width "W" that extends through the one or more layers to the outer surface of the bottom plate without scoring, abrading, or otherwise damaging the top plate, and the scriber tool passes within the channel to create a scribe line in the surface of the bottom plate.

18. The method of claim 17, further comprising:
   breaking the top and bottom plates along the scribe lines to completely separate the target portion from the excess portion, thereby creating an exposed edge; and
   applying a seal along the exposed edge.

19. The method of claim 15, further comprising cleaning the channel before passing the scriber tool along the cut line.

20. The method of claim 19, wherein cleaning comprises at least one of delivering a solvent along the channel using the cutting assembly to dissolve material from within the channel and directing a tool on the cutting assembly along the channel to remove material from within the channel.

21. The method of claim 1, wherein the width "W" is about 1.25 millimeters (0.050 inch) or less.

22. The method of claim 1, wherein the scriber tool has a width smaller than the width "W" such that the scriber tool contacts the surface of the top plate without requiring further removal of the polarizer material.

23. The method of claim 1, further comprising cleaning the outer surface of the top plate along the cut line before passing the scriber tool along the cut line.

24. The method of claim 10, wherein breaking the top and bottom plates along the scribe line comprises breaking the top and bottom plates separately.

25. A method for resizing an electronic display including top and bottom plates, and imaging-generating medium sealed between the top and bottom plates to define a display image area of the display, the display comprising one or more film layers overlying an outer surface of the top plate, the method comprising:
   identifying a cut line overlying the display image area and defining a target portion and an excess portion of the display;
   passing a fine-toothed round saw along the cut line over the display such that the saw removes film material and creates a channel having a width "W" that extends through the one or more film layers to the outer surface of the top plate without cutting into the outer surface of the top plate, the saw having a width corresponding to the width "W" or slightly less than "W"; and
   passing a scriber tool along the cut line to create a scribe line in the outer surface of the top plate.

26. The method of claim 25, further comprising cleaning the outer surface of the top plate along the cut line before passing the scriber tool along the cut line.

27. The method of claim 26, wherein cleaning comprises delivering a solvent along the cut line to dissolve material from the outer surface of the top plate.

28. The method of claim 26, wherein passing the fine-toothed round saw tool, passing the scriber tool, and cleaning the outer surface are accomplished in a single pass of a cutting assembly along the cut line.

* * * * *